Feb. 25, 1964  H. R. ENGLE ETAL  3,121,961
TRAINING AID
Filed Sept. 13, 1961
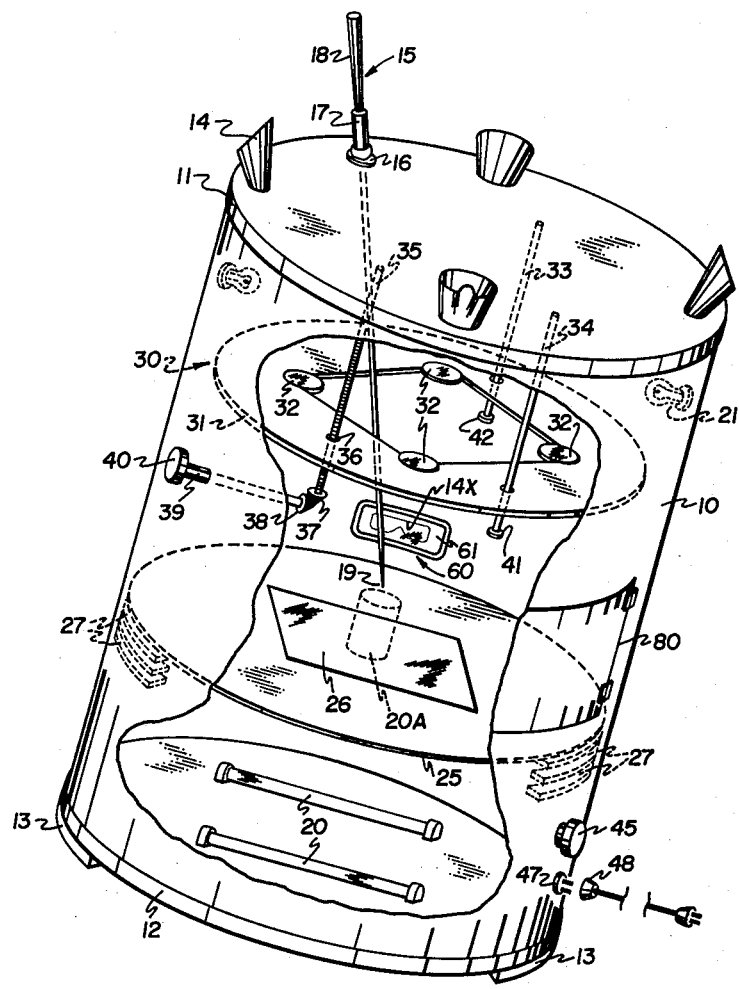
FIG. 1
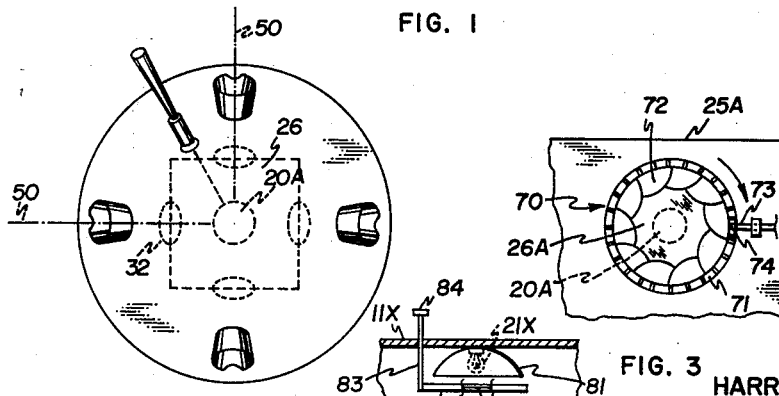
FIG. 2
FIG. 3
FIG. 4
INVENTOR.
HARRIET R. ENGLE
MORRIS A. ENGLE
BY
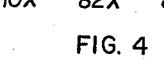
Attorneys 3,121,961
TRAINING AID
Harriet R. Engle and Morris A. Engle, both of
366 Clermont Parkway, Denver, Colo.
Filed Sept. 13, 1961, Ser. No. 137,773
16 Claims. (Cl. 35—20)

This invention relates to science training aids.

There has been a need for relatively inexpensive yet efficient and easily operated systems and training apparatus whereby students, at an early age, can be stimulated to greater interest in the physical and psychological sciences. Expensive optical systems of microscopes, various photographic and electrical apparatus are available for science studies, but the fragile and delicate character of specimen mount devices and the difficulty of specimen preparation as well as the degree of training necessary before a student can properly utilize them has prevented their use in the primary grades and for similar purposes.

Accordingly, it is an object of this invention to provide training aids for use at the primary educational level; which training aids are rugged, yet simple enough that the students themselves may operate them effectively with negligible training or instruction; and which aids are designed to promote and stimulate interest in the physical and physiological sciences at primary educational levels.

It is another object of the invention to provide rugged, inexpensive and easily manufactured unitary training aids adapted for use by groups in studying physical and physiological sciences.

Yet another object of the invention is to provide a simple and efficient training aid for the study of both transparent and opaque objects; which training aid is adapted to provide a three dimensional image of living specimens for study; and which training aids allow magnification of images of such objects and specimens under observation.

In one embodiment, a training aid according to this invention includes a hollow housing of generally cylindrical shape having a closed top and bottom. A plurality of viewing stations are located in the top, each of which is adapted for use by one student. A plurality of magnifying lenses, one for each of the plurality of viewing stations, are disposed in the interior between such stations and a table which has a substantially centrally located ground glass screen upon which sample containers and specimens are placed when the device is in use.

A plurality of light sources are provided, including a plurality of tungsten filament lamps below the viewing table supported from the bottom of the housing and a plurality of incandescent light sources mounted adjacent the top of the housing. All of the light sources, including both the incandescent and tungsten filament sources, are adapted for separate selective adjustment as to light intensity by use of a rheostat or similar control. Means are provided by which the relative position of either the magnifying lenses to the viewers or the sample table to the magnifying devices can be adjusted, thereby providing adjustability as to magnification.

An externally-operable, extensible pointer is arranged for manipulation to direct student attention to various characteristics, portions, etc. of a sample on the ground glass screen under observation at the viewing stations.

Various shadow effects may be obtained by use of the rheostats varying the light intensity of the tungsten filament and/or incandescent light sources. With various transparent and semitransparent specimens such as a polywog or leaves, it is possible to view some internal organs and observe skeletal arrangements, including relative movement of portions of the skeletal arrangements in the specimen being studied.

The practice of our invention will be described with reference to the appended drawings, in which like reference numerals are used to designate like parts in the several views, and in which:

FIG. 1 is a perspective view of a preferred form of training aid, partially broken away to show arrangement and cooperation of internal parts;

FIG. 2 is a top elevation of the training aid of FIG. 1, with some parts omitted in order to simplify illustration of essential features in the operation of the device;

FIG. 3 is an enlarged fragmentary view of an alternative arrangement for the specimen table and viewing screen; and FIG. 4 is a fragmentary side elevation of an alternative arrangement for the upper light source.

Training aids according to our invention are intended primarily for use in teaching physical and physiological sciences to younger children, such as those at the primary educational level. However, it should be understood that it is equally useful for teaching at higher educational levels, if desired and for use by groups of mixed ages. In our preferred embodiment, a teaching aid according to this invention is a unitary device or assembly comprised of an upstanding generally cylindrical housing 10 having removable top and bottom cover sections 11 and 12. The bottom section 12 carries a plurality of spaced legs 13 adapted to support the housing 10 on a supporting surface such as a floor, table or desk. As shown, housing 10 has four legs 13 spaced at 90° intervals relative to each other.

The top closure member 11 has a plurality of spaced viewing stations 14. These stations provide a view through the top cover 11 and are so designed that a student may place the forepart of his face into a light-excluding fit with the enclosure for the upper opening when viewing specimens on display in the interior. We have shown four such viewing stations in FIG. 1, but it should be understood that varying numbers may be used, although six appear to be the optimum number for satisfactory instructor control. An extensible pointer assembly 15 is provided and includes a spherical type ball universal joint 16 carrying a sleeve 17 integrally attached therewith. An elongated pointer or rod 18 extends through sleeve 17 and terminates in a narrow end 19 adjacent a specimen or object being viewed or studied in the device. Such an object is indicated in dotted lines 20A.

The interior structure of the assembly comprises an illuminating system preferably utilizing a pair of tubular tungsten filament type light sources 20 and a plurality of incandescent upper light sources 21. A sample table 25 is located above the tungsten filament light sources 20 and is adjustable as to height relative to the light sources 20 by selective placement in horizontally aligned pairs of cleats 27 mounted on the interior walls of the housing. The table has a central light permeable ground glass specimen supporting screen 26. A magnifying assembly 30 is mounted above the viewing table and the ground glass screen. This assembly is comprised of an annular frame member 31 carrying a plurality of magnifying lenses 32 at uniformly spaced intervals, one each in the line of sight of each of the viewing stations 14. The magnifying assembly is supported from the top cover 11 by a plurality of supports 33, 34 and 35. The support 35 is externally threaded and adapted to cooperate with internal complementary threading in the aperture 36 through the frame 31. Support 35 terminates in a tapered bevel gear 37 adapted to cooperate with bevel gear 38 at the terminal end of rod 39 whereby suitable manipulation of knob 40 causing rotation of bevel gear 38 and bevel gear 37 causes upward and downward movement of the magnifying assembly 30.

The supports 33 and 34 are shown as being smooth and the apertures in casing 31 through which they pass are likewise smooth but are of such a tolerance as to not permit wobble in the frame during upward and downward movements thereof under influence of the threaded support 35. Each of the supports 33 and 34 have bottom stops 41 and 42 spaced slightly above the plane of the top of bevel gear 37. If desired, supports 33 and 34 may be externally threaded and cooperate with an arrangement similar to that associated with support 35.

The light sources 20 and 21 are preferably wired in two series whereby, by suitable manipulation of a rheostat, light intensity emanating from either series may be separately and selectively adjusted. In the drawings, a rheostat knob 45 has been shown. No details of the rheostat have been set forth in the drawings since any of the many conventionally known variable resistance devices used to vary electrical current may be used. We prefer to include a male fixture 47 at a lower portion of the assembly for interconnection with a female fixture 48 to supply electrical current to the light sources.

Each of the viewing stations preferably is inclined at an angle (FIG. 2) such that lines of sight 50 are directed through the bottom opening of the viewers and the magnifying lenses 32 to ground glass screen 26 and a specimen 20A thereon.

We also prefer to include an additional viewer assembly 60 slightly above the uppermost possible level of viewing table 25 whereby a specimen may be viewed in a horizontal plane. The viewer assembly 60 includes an internal magnifying lens 61 and an externally accessible viewer 14X. We have shown but one of these viewer assemblies 60 and have indicated it as fixed. However, it should be understood that the lens may be adjustable and that there may be a plurality of such horizontally placed viewers.

We have found that the combination of incandescent and tubular tungsten filament light sources, as shown in the exemplary drawings, are preferred since the characteristic of tubular tungsten filament lamps to considerably reduce the yellow spectrum and provide a more daylight intensity, is most favorable for study and examination of transparent and semi-transparent samples and specimens. Also, the more developed yellow light spectrum of an incandescent bulb is preferred for obtaining shadow effects when studying more opaque specimens and objects. Alternatively, fluorescent tubes may be substituted as light sources 20, although it is more difficult to provide means to vary the intensity of light emitted from them.

While we have shown a cylindrical shaping for housing 10, it should be understood that a square or other configuration may be used as desired. For instance, a hexagonal configuration would be useful in providing a plurality of student stations, each one having a viewer adjacent one of the sides of the hexagon. Also, while we have shown removable top and bottom members, which are preferable for ease of access in insertion and removal of specimens or to repair internal parts, the device may have only a removable top or smaller access opening.

With certain physical and physiological specimens it is desirable to provide a higher portion of the blue or red spectrum, as the case may be, and to this end it is within our concepts to provide filters which are placed on the ground glass screen below the sample or specimen being studied. Alternatively, the arrangement of FIG. 4 may be used in which a single incandescent bulb 21X is mounted within a reflector 81 below top 11X of housing 10X and a filter 82 is arranged to be selectively positioned therebeneath. Filter 82 is mounted in a suitable frame 82X suspended on the bottom of rotatable rod 83. The outer end of rod 83 has a knob 84 by which the rod is rotated and the filter selectively positioned beneath the reflector. Furthermore, with certain specimens wherein it is desired to control the intensity of light and to direct it at a particular portion of a specimen, and arrangement of FIG. 3 is particularly suitable.

In FIG. 3 a sample table 25A is shown from the bottom. Substantially centrally of table 25A is a ground glass screen 26A. Below the ground glass screen 26A is an iris-type diaphragm assembly 70. The iris shutter assembly includes a movable ring 71 having suitably affixed thereto a plurality of thin plates 72 which, upon rotation of the ring 71, open or close the central aperture and thus the area through which light may pass. A suitable arrangement for adjusting the light aperture externally of a housing includes an externally manipulated knurled knob 72A interconnected through a shaft 73 with a gear wheel 74 adapted for meshing with gear teeth on the outer peripheral edge of ring 71. As schematically indicated in FIG. 3, by the arrowheads, rotation of the knob 72 causes rotation of the ring 71 for opening and closing of the iris aperture.

With some smaller and more portable assemblies of training aids according to the concepts of this invention, it is desirable to affix handles or the like, either to the upper closure member 11 or to the side of the casing 10 whereby the device is easily moved from one station to another.

When utilizing our training aids to study transparent or semi-transparent specimens, including live biological specimens such as tadpoles or the like placed in a jar of water, and placed on the viewing screen, by suitable manipulation of the intensity of the light sources not only is the outward appearance of the sample easily visible through the magnifying power of lenses 32, but, by decreasing the intensity of the incandescent light sources 21 and increasing the intensity of the tungsten filament light sources 20, various internal organs of the specimens become visible; and also, their skeletal arrangement, may be observed in actual motion. When viewing more opaque objects, such as metallic ore specimens, increase in the intensity of the incandescent light sources 21, in combination with the decrease in intensity of light source 20, provides shadow effects and selective illumination of portions of the sample for study.

Because of the simplicity of parts it is possible to fabricate them out of almost any material. Furthermore, it is possible to provide self-assembly kits to those who desire to construct their own training aids. That is, the casing, the top and bottom, the viewers, the separate magnifying devices and their support arrangement, the viewing table and light sources, etc., may be separately and individually packaged as a "do-it-yourself" type kit.

Another desirable adjunct to training aids according to our invention is that a single instructor can hold the attention of a plurality of students while working on a specimen, such as dissecting of a biological specimen. To this end we provide a pair of hinged doors 80, one of which is shown in FIG. 1, whereby a plurality of students viewing the operation through the viewers 14 have each of the movements of the instructor during the dissection on the viewing table 25 closely observed. The same hinged doors 80 provide great ease of substitution of samples, as desired.

It should be understood that the foregoing explanation and the exemplary drawings are merely indicative of various arrangements for training aids embodying the concepts of our invention, and that still other arrangements may be availed of within the spirit and scope of the invention as set forth in the hereunto appended claims.

We claim:

1. In a training aid of the type described, a hollow, light-confining housing, a viewer opening through an upper portion thereof, means in the housing below the viewer opening maintaining a magnifying lens in the line of sight through said opening, supporting means in the housing below said lens having a ground glass central portion, a first light-emitting source mounted above and directed toward the ground glass portion, a second light-emitting source disposed below and directed toward the ground glass portion, and means for selectively and separately adjusting the light intensity of each said source.

2. In a training aid of the type described, a hollow, light-confining housing, a plurality of spaced viewer openings through an upper portion thereof, means in the housing below the viewer openings maintaining a plurality of magnifying lenses disposed in the line of sight through the respective openings, supporting means in the housing below the lenses having a light-permeable central portion in intercepting relation to the respective lines of sight, a first light-emitting source mounted above and directed toward the light-permeable portion, a second light-emitting source below and directed toward said light-permeable portion, and means for selectively and separately adjusting the light intensity of each said source.

3. The training aid of claim 2 in which the housing is generally cylindrical with viewer stations disposed at uniform intervals about an upper peripheral portion thereof.

4. In a training aid of the type described, a hollow, light-confining housing, a plurality of spaced viewer openings through the upper portion thereof, first means in the housing below the viewer openings maintaining a plurality of magnifying lenses disposed in the line of sight through the respective openings, means interconnected with the first means and arranged for raising and lowering it to vary the magnification relative to the viewing openings, supporting means in the housing below the lenses having a light-permeable central portion in intercepting relation to the respective lines of sight, a first light-emitting source mounted above and directed toward the light-permeable portion, a second light-emitting source mounted below and directed toward the light permeable portion, and means for selectively and separately adjusting the light intensity of each of said source.

5. In a training aid of the type described, a hollow, light-confining housing, a plurality of spaced viewer openings through the upper portion thereof, first means in the housing below the viewer openings maintaining a plurality of magnifying lenses in the line of sight through the respective openings, externally-accessible means interconnected with the first means for raising and lowering the lenses relative to the viewing openings whereby magnification is varied relative to a specimen, supporting means in the housing below the lenses having a ground-glass specimen supporting portion in intercepting relation to the respective lines of sight, a first light-emitting source mounted above and directed toward the ground glass portion, a second light-emitting source mounted below and directed toward the ground glass portion, and means for selectively and separately adjusting the light intensity of each said source.

6. The training aid described in claim 5 in which the first light-emitting source is an incandescent source, and in which the second source is a fluorescent source.

7. In a training aid of the type described, a hollow, light-confining housing, a plurality of spaced viewer openings through upper peripheral portions thereof, means in the housing below the viewer openings carrying a plurality of magnifying lenses in the line of sight through the respective openings and arranged for adjustable movement so as to vary relative magnification by variation of the distance of the lenses from the viewer openings, supporting means in the housing below said lenses having a ground glass specimen supporting portion in intercepting relation to the respective lines of sight, a first light-emitting source mounted above and directed toward the ground glass specimen support, a second light-emitting source below and directed toward the ground glass specimen support, and means for selectively and separately adjusting the intensity of light emission of each said source, said adjusting means being separate, exteriorly-accessible rheostats.

8. In a training aid of the type described, a hollow, light-confining housing, a plurality of spaced viewer openings through upper peripheral portions thereof, means in the housing below the viewer openings maintaining a plurality of magnifying lenses in the line of sight through the respective openings and arranged for adjustable movement so as to vary relative magnification by variation of the distance of the lenses from the viewer openings, supporting means in the housing below said lenses having a ground glass specimen supporting portion in intercepting relation to the respective lines of sight, a first light-emitting source mounted above and directed toward the ground glass specimen support, a second light-emitting source below and directed toward the ground glass specimen support, and means for selectively and separately adjusting the intensity of light emission, said adjusting means being separate, exteriorly-accessible rheostats, and a substantially universally mounted extensible and retractable pointer having one end protruding from the housing adjacent the viewer openings and having the other end adapted for close positioning adjacent the ground glass specimen support within the lines of sight.

9. A training aid of the type described, comprising a base-supported, hollow housing of substantial vertical extent closed on its sides and ends, a plurality of circumferentially-spaced viewer stations in the top, each having a light shield enclosure for support of the face of an observer in a viewing position, means in an upper portion of the housing for supporting a plurality of magnifying lenses in a common plane with one lens in visual alinement with each viewing station, a light-permeable specimen support disposed below the lens support in intercepting relation to the paths of visual alinement through the lenses, a tungsten filament light source beneath the specimen support, and an incandescent light source above the specimen support.

10. A training aid of the type described, comprising a base-supported, hollow housing of substantial vertical extent closed on its sides and ends, a plurality of circumferentially-spaced viewers stations in the top, each having a light shield enclosure for support of the face of an observer in a viewing position, vertically-adjustable means in an upper portion of the housing for supporting a plurality of magnifying lenses in a common plane with one lens in visual alinement with each viewing station, a light-permeable specimen support disposed below the lens support in intercepting relation to the paths of visual alinement through the lenses, a tungsten filament light source beneath the specimen support, and an incandescent light source above the specimen support.

11. A training aid of the type described, comprising a base-supported, hollow housing of substantial vertical extent closed on its sides and ends, a plurality of circumferentially-spaced viewers stations in the top, each having a light shield enclosure for support of the face of an observer in a viewing position, means in an upper portion of the housing for supporting a plurality of magnifying lenses in a common plane with one lens in visual alinement with each viewing station, a vertically-adjustable light-permeable specimen support disposed below the lens support in intercepting relation to the paths of visual alinement through the lenses, a tungsten filament light source beneath the specimen support, and an incandescent light source above the specimen support.

12. A training aid of the type described, comprising a base-supported, hollow housing of substantial vertical extent closed on its sides and ends, a plurality of circumferentially-spaced viewer stations in the top, each having a light shield enclosure for support of the face of an observer in a viewing position, means in an upper portion of the housing for supporting a plurality of magnifying lenses in a common plane with one lens in visual alinement with each viewing station, a light-permeable specimen support disposed below the lens support in intercepting relation to the paths of visual alinement through the lenses, a tungsten filament light source beneath the specimen support, means for varying the intensity of light emission from said source, and an incandescent light source above the specimen support.

13. A training aid of the type described, comprising a base-supported, hollow housing of substantial vertical extent closed on its sides and ends, a plurality of circumferentially-spaced viewer stations in the top, each having a light shield enclosure for support of the face of an observer in a viewing position, means in an upper portion of the housing for supporting a plurality of magnifying lenses in a common plane with one lens in visual alinement with each viewing station, a light-permeable specimen support disposed below the lens support in intercepting relation to the paths of visual alinement through the lenses, a tungsten filament light source beneath the specimen support, an incandescent light source above the specimen support, and means for varying the intensity of light emission from said source.

14. A training aid of the type described comprising a base-supported, hollow housing of substantial vertical extent closed on its sides and ends, a plurality of circumferentially-spaced viewer stations in the top, each having a light shield enclosure for support of the face of an observer in a viewing position, means in an upper portion of the housing for supporting a plurality of magnifying lenses in a common plane with one lens in visual alinement with each viewing station, a light-permeable specimen support disposed below the lens support in intercepting relation to the paths of visual alinement through the lenses, a tungsten filament light source beneath the specimen support, and an incandescent light source above the specimen support and common plane of the lenses.

15. A training aid of the type described, comprising a base-supported, hollow housing of substantial vertical extent closed on its sides and ends, a plurality of circumferentially-spaced viewer stations in the top, each having a light shield enclosure for support of the face of an observer in a viewing position, means in an upper portion of the housing for supporting a plurality of magnifying lenses in a common plane with one lens in visual alinement with each viewing station, a light-permeable specimen support disposed below the lens support in intercepting relation to the paths of visual alinement through the lenses, a color filter mounted on the top surface of the specimen support, a tungsten filament light source beneath the specimen support, and an incandescent light source above the specimen support.

16. A training aid of the type described, comprising a base-supported, hollow, light-confining housing of substantial vertical extent closed on its sides and ends, a plurality of circumferentially-spaced viewer stations in the top, each having a light shield enclosure for support of the face of an observer in a viewing position, vertically-adjustable means in an upper portion of the housing for supporting a plurality of magnifying lenses in a generally-horizontal plane with one lens in visual alinement with each viewing station, a vertically-adjustable ground glass specimen support disposed below the lens support in intercepting relation to the paths of visual alinement through the lenses, a tungsten filament light source mounted beneath and directed toward the specimen support and having means for varying the intensity of its light emission, an incandescent light source mounted above and directed toward the specimen support and having means for varying the intensity of its light emission, and a normally-closed access opening in the housing adjacent said specimen support.

References Cited in the file of this patent
UNITED STATES PATENTS

| | | |
|---|---|---|
| 1,242,377 | Schmidt | Oct. 9, 1917 |
| 2,146,506 | Maisch | Feb. 7, 1939 |
| 2,209,532 | Michel | July 30, 1940 |
| 2,503,342 | Knight | Apr. 11, 1950 |